United States Patent
Chuang

(10) Patent No.: US 12,489,366 B2
(45) Date of Patent: Dec. 2, 2025

(54) POWER SUPPLY CIRCUIT, VOLTAGE DROP COMPENSATION METHOD AND ELECTRONIC PRODUCT USING THE SAME

(71) Applicant: Qisda Corporation, Taoyuan (TW)

(72) Inventor: Jen-Te Chuang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 209 days.

(21) Appl. No.: 18/236,452

(22) Filed: Aug. 22, 2023

(65) Prior Publication Data
US 2024/0097562 A1    Mar. 21, 2024

(30) Foreign Application Priority Data

Sep. 16, 2022   (CN) .......................... 202211126515.7

(51) Int. Cl.
| | |
|---|---|
| H02M 3/04 | (2006.01) |
| H02M 1/00 | (2006.01) |
| H02M 1/32 | (2007.01) |
| H02M 3/00 | (2006.01) |
| H02M 1/44 | (2007.01) |

(52) U.S. Cl.
CPC ........... *H02M 3/04* (2013.01); *H02M 1/0016* (2021.05); *H02M 1/32* (2013.01); *H02M 3/003* (2021.05); *H02M 1/44* (2013.01)

(58) Field of Classification Search
CPC ........ H02M 3/04; H02M 1/0016; H02M 1/32; H02M 3/003; H02M 1/44
See application file for complete search history.

(56) References Cited

U.S. PATENT DOCUMENTS

| | | | | |
|---|---|---|---|---|
| 7,974,060 | B2* | 7/2011 | Morino | G05F 1/573 |
| | | | | 361/93.9 |
| 9,385,489 | B2* | 7/2016 | Wang | H01R 13/70 |
| 11,050,238 | B2* | 6/2021 | Boros | H02H 3/18 |
| 2003/0021129 | A1* | 1/2003 | Balakrishnan | G01R 31/40 |
| | | | | 363/21.01 |
| 2006/0227481 | A1* | 10/2006 | Huang | G06F 1/26 |
| | | | | 361/104 |
| 2008/0024099 | A1* | 1/2008 | Oki | H02M 3/156 |
| | | | | 361/18 |
| 2008/0247108 | A1* | 10/2008 | Ando | H02H 7/0833 |
| | | | | 361/84 |
| 2008/0297963 | A1* | 12/2008 | Lee | H02H 7/1222 |
| | | | | 361/87 |

(Continued)

*Primary Examiner* — Yusef A Ahmed

(57) ABSTRACT

A power supply circuit includes a voltage conversion circuit, a signal path, a connector, and a feedback path. The voltage conversion circuit receives and converts an input voltage into an output voltage. A voltage drop is generated when the output voltage flows through the signal path. The connector is coupled to the voltage conversion circuit through the signal path, wherein the output voltage flows through the signal path then enters the connector as a connector voltage, which supplies power to an external device when the external device is connected to the connector. The feedback path is coupled to the voltage conversion circuit and the connector, wherein the connector voltage is fed back to the voltage conversion circuit as an induced voltage through the feedback path, and the voltage conversion circuit adjusts the output voltage according to the induced voltage.

9 Claims, 2 Drawing Sheets

(56) References Cited

U.S. PATENT DOCUMENTS

| | | | | |
|---|---|---|---|---|
| 2010/0289466 A1* | 11/2010 | Telefus | | H02M 3/155 |
| | | | | 323/282 |
| 2011/0037445 A1* | 2/2011 | Ting | | H02J 7/0071 |
| | | | | 323/234 |
| 2012/0223644 A1* | 9/2012 | Wang | | H05B 45/50 |
| | | | | 361/87 |
| 2013/0064566 A1* | 3/2013 | Kojima | | H02M 3/33523 |
| | | | | 363/21.01 |
| 2014/0300330 A1* | 10/2014 | Sugiyama | | H02M 3/156 |
| | | | | 323/271 |
| 2014/0307485 A1* | 10/2014 | Xu | | H02M 3/33523 |
| | | | | 363/21.13 |
| 2014/0354253 A1* | 12/2014 | Nie | | H02M 1/32 |
| | | | | 323/282 |
| 2015/0029762 A1* | 1/2015 | Lu | | H02M 3/33523 |
| | | | | 363/21.17 |
| 2015/0180355 A1* | 6/2015 | Freeman | | H02M 1/12 |
| | | | | 363/21.04 |
| 2015/0333514 A1* | 11/2015 | Wang | | H02J 1/04 |
| | | | | 307/103 |
| 2016/0373007 A1* | 12/2016 | Lu | | H02M 1/36 |
| 2016/0373011 A1* | 12/2016 | Kawashima | | H02M 1/32 |
| 2017/0099011 A1* | 4/2017 | Freeman | | H02M 7/06 |
| 2017/0288434 A1* | 10/2017 | Narita | | H02M 1/08 |
| 2018/0013283 A1* | 1/2018 | Liu | | H02H 9/02 |
| 2018/0287486 A1* | 10/2018 | Peng | | H02M 1/34 |
| 2019/0204161 A1* | 7/2019 | Degen | | G01K 7/18 |
| 2020/0014294 A1* | 1/2020 | Song | | H02M 3/158 |
| 2020/0161969 A1* | 5/2020 | Li | | H02M 3/156 |
| 2021/0067037 A1* | 3/2021 | Namekawa | | H02M 1/32 |
| 2023/0031068 A1* | 2/2023 | Quintero | | H02M 7/217 |
| 2023/0179077 A1* | 6/2023 | Mishima | | H02M 1/0025 |
| | | | | 323/283 |
| 2023/0253775 A1* | 8/2023 | Fang | | H02H 3/20 |
| | | | | 361/91.1 |
| 2024/0006999 A1* | 1/2024 | Zhang | | H02M 3/33507 |
| 2024/0266945 A1* | 8/2024 | Yang | | H02M 1/14 |
| 2025/0070670 A1* | 2/2025 | Okajima | | H02M 1/36 |

* cited by examiner

POWER SUPPLY CIRCUIT, VOLTAGE DROP COMPENSATION METHOD AND ELECTRONIC PRODUCT USING THE SAME

This application claims the benefit of People's Republic of China application Serial No. 202211126515.7, filed Sep. 16, 2022, the subject matter of which is incorporated herein by reference.

BACKGROUND OF THE INVENTION

Field of the Invention

The invention relates in general to a power supply circuit, a voltage drop compensation method and an electronic product using the same.

Description of the Related Art 3C products have become indispensable to modern people in their daily lives. Currently, the power capacity of 3C products is getting bigger and bigger. For instance, a USB type-C connector can support up to 100 W. However, such a large volume of power supply may end up with a severe voltage drop at the connector of power supply due to the power consumption of internal circuit-board traces and protection elements. Such severe voltage drop can lead to insufficient power supply or even is unable to start the internal device such as motor.

Therefore, it has become a prominent task for the industries to disclose a power supply circuit, a voltage drop compensation method and an electronic product using the same capable of compensating the voltage drop, to increase the power supply performance of the electronic product and the power supply circuit without employing any additional elements.

SUMMARY OF THE INVENTION

According to one embodiment of the present invention, a power supply circuit including a voltage conversion circuit, a signal path, a connector, and a feedback path is provided. The voltage conversion circuit receives and converts an input voltage into an output voltage. The signal path is coupled to the voltage conversion circuit, wherein a voltage drop is generated when the output voltage flows through the signal path. The connector is coupled to the voltage conversion circuit through the signal path, wherein the output voltage flows through the signal path then enters the connector as a connector voltage, the connector voltage supplies power to an external device when the external device is connected to the connector. The feedback path is coupled to the voltage conversion circuit and the connector, wherein the connector voltage is fed back to the voltage conversion circuit as an induced voltage through the feedback path, and the voltage conversion circuit adjusts the output voltage according to the induced voltage.

According to another embodiment of the present invention, an electronic product including an outer casing and a power supply circuit is provided. The power supply circuit is arranged inside the outer casing. The power supply circuit receives and converts an input voltage into an output voltage. When the output voltage flows through a signal path of the power supply circuit, a voltage drop is generated, and the output voltage becomes a connector voltage. When an external device is connected to the electronic product, the connector voltage supplies power to the external device. The connector voltage is fed back as an induced voltage through a feedback path of the power supply circuit, and the voltage conversion circuit adjusts the output voltage according to the induced voltage.

According to an alternate embodiment of the present invention, a voltage drop compensation method used in a power supply circuit is provided. The voltage drop compensation method includes: receiving and converting an input voltage into an output voltage by a voltage conversion circuit of the power supply circuit, wherein, a voltage drop is generated when the output voltage flows through a signal path of the power supply circuit; enabling the output voltage to flow through the signal path and enter a connector of the power supply circuit as a connector voltage, the connector voltage supplying power to an external device when the external device is connected to the connector; feeding the connector voltage back to the voltage conversion circuit of the power supply circuit as an induced voltage; and adjusting the output voltage by the voltage conversion circuit according to the induced voltage.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
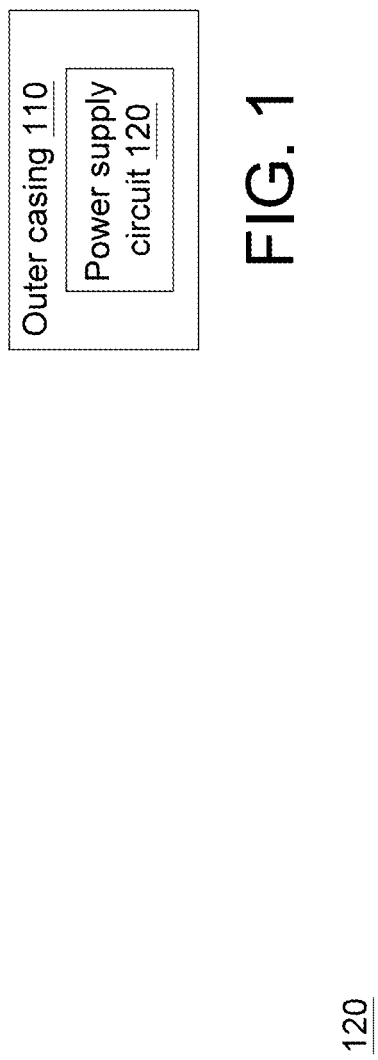
FIG. 1 is a schematic diagram of an electronic product according to an embodiment of the present invention.

FIG. 1 is a schematic diagram of an electronic product according to an embodiment of the present invention. As indicated in FIG. 1, the electronic product 100 according to an embodiment of the present invention includes an outer casing 110 and a power supply circuit 120 arranged inside the outer casing 110. The power supply circuit 120 can convert a DC or AC power into an output voltage. The output voltage flows through circuit-board traces or other electronic elements then becomes a connector voltage, which supplies power to an external device.

The electronic product 100 can be realized by a 3C product with DC power supply, such as a projector or a notebook computer, but the invention is not limited thereto.

Exemplarily but not restrictively, the external device powered by the electronic product 100 is connected to the electronic product 100 through USB. The external device can be realized by such as a USB flash drive or a USB cable, but the invention is not limited thereto.

In an electronic product 100 according to an embodiment of the present invention, the power supply circuit receives and converts an input voltage into an output voltage. When the output voltage flows through a signal path of the power supply circuit, a voltage drop is generated, and the output voltage becomes a connector voltage. When an external device is connected to the electronic product, the connector voltage supplies power to the external device. The connector voltage is fed back as an induced voltage through a feedback path of the power supply circuit, and the voltage conversion circuit adjusts the output voltage according to the induced voltage.

Figure 2:
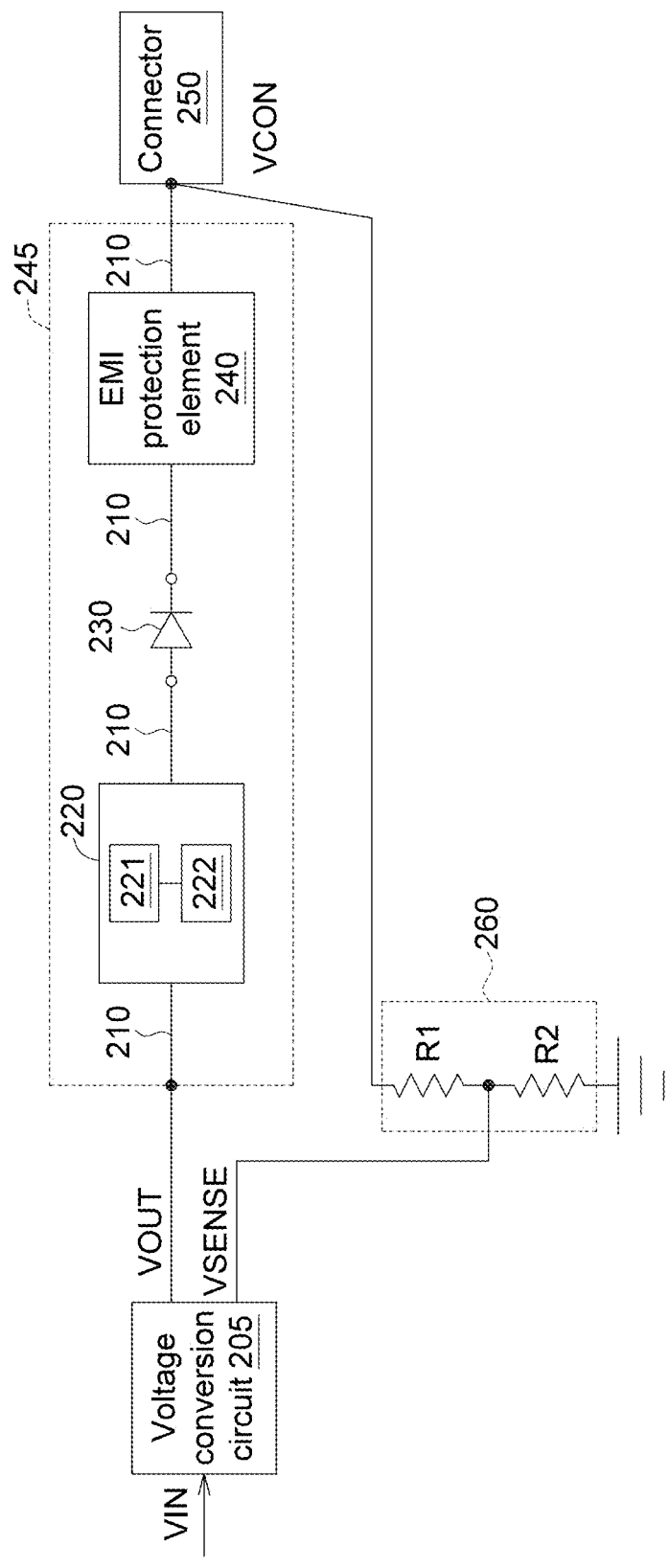
FIG. 2 is a schematic diagram of a power supply circuit according to an embodiment of the present invention.

FIG. 2 is a schematic diagram of a power supply circuit according to an embodiment of the present invention. The power supply circuit 120 includes a voltage conversion circuit 205, a circuit-board trace 210, an overcurrent protection element 220, a diode 230, an electromagnetic interference (EMI) protection element 240, a connector 250 and a voltage divider circuit 260. In an embodiment of the present invention, the overcurrent protection element 220, the diode 230, the EMI protection element 240 can be coupled in a sequence other than the one exemplified in FIG. 2. In an embodiment of the present invention, the circuit-board trace 210, the overcurrent protection element 220, diode 230, and the EMI protection element 240 together are referred as a signal path 245. That is, in an embodiment of the present invention, the signal path 245 includes any combination of the circuit-board trace 210, the overcurrent protection element 220, the diode 230, and the EMI protection element 240, and such arrangement is still within the spirit of the present invention.

The voltage conversion circuit 205 can be realized by a DC-DC converter or an AC-DC converter, but the invention is not limited thereto. In the disclosure below, the voltage conversion circuit 205 is exemplified by a DC-DC converter.

The voltage conversion circuit 205 receives and converts a DC input voltage VIN into a DC output voltage VOUT. The DC output voltage VOUT flows through the circuit-board trace 210, the overcurrent protection element 220, the diode 230, the EMI protection element 240 then enters the connector 250 as a connector voltage VCON. That is, the DC output voltage VOUT flows through the signal path 245 then enters the connector 250 as the connector voltage VCON.

In an embodiment of the present invention, the connector voltage VCON conforms with USB specification (5V±5%) and is not limited thereto.

The circuit-board trace 210 is coupled to the voltage conversion circuit 205. The circuit-board trace 210 is a signal wire on a circuit board. Here, the circuit board can be realized by a printed circuit board (PCB), but the invention is not limited thereto. When the DC output voltage VOUT flows through the circuit-board trace 210, a voltage drop is generated.

The overcurrent protection element 220 is coupled to the voltage conversion circuit 205 through the circuit-board trace 210. The overcurrent protection element 220 can protect overcurrent. In an embodiment of the present invention, the overcurrent protection element 220 can be realized by any combination of current switch 221, e-fuse (e-fuse) 222 and other similar element, and such arrangement is still within the spirit of the present invention. When the DC output voltage VOUT flows through the overcurrent protection element 220, a voltage drop is generated.

The diode 230 is coupled to the voltage conversion circuit 205 through the circuit-board trace 210. In an embodiment of the present invention, the diode 230 can be replaced with other types of diode, such as Schottky diode, and such arrangement is still within the spirit of the present invention. When the DC output voltage VOUT flows through the diode 230, a voltage drop is generated.

The EMI protection element 240 is coupled to the voltage conversion circuit 205 through the circuit-board trace 210. The EMI protection element 240 is a passive element used to suppress high-frequency noises of the circuit. In an embodiment of the present invention, the EMI protection element 240 can be realized by beads, but the invention is not limited thereto.

The DC output voltage VOUT flows through the signal path 245 then enters the connector 250 as the connector voltage VCON. When an external device is connected to the connector 250, the connector voltage VCON supplies power to the external device.

The connector voltage VCON is fed back to the voltage conversion circuit 205 through the feedback path. The feedback path is coupled to the voltage conversion circuit 205 and the connector 250. In an embodiment of the present invention, the feedback path can be realized by the voltage divider circuit 260, but the present invention is not limited thereto. The voltage divider circuit 260 includes resistors R1 and R2 connected in series, wherein the resistor R1 is coupled between the connector voltage VCON of the connector 250 and the voltage conversion circuit 205; and the resistor R2 is coupled between the voltage conversion circuit 205 and the ground end. The voltage divider circuit 260 divides the connector voltage VCON into an induced voltage VSENSE, which is fed back to the voltage conversion circuit 205. The induced voltage VSENSE can be expressed as: $VCON=VSENSE*(1+(R1/R2))$.

The voltage conversion circuit 205 can adjust the DC output voltage VOUT according to the induced voltage VSENSE, so that the connector voltage VCON can meet the requirements.

Figure 3:
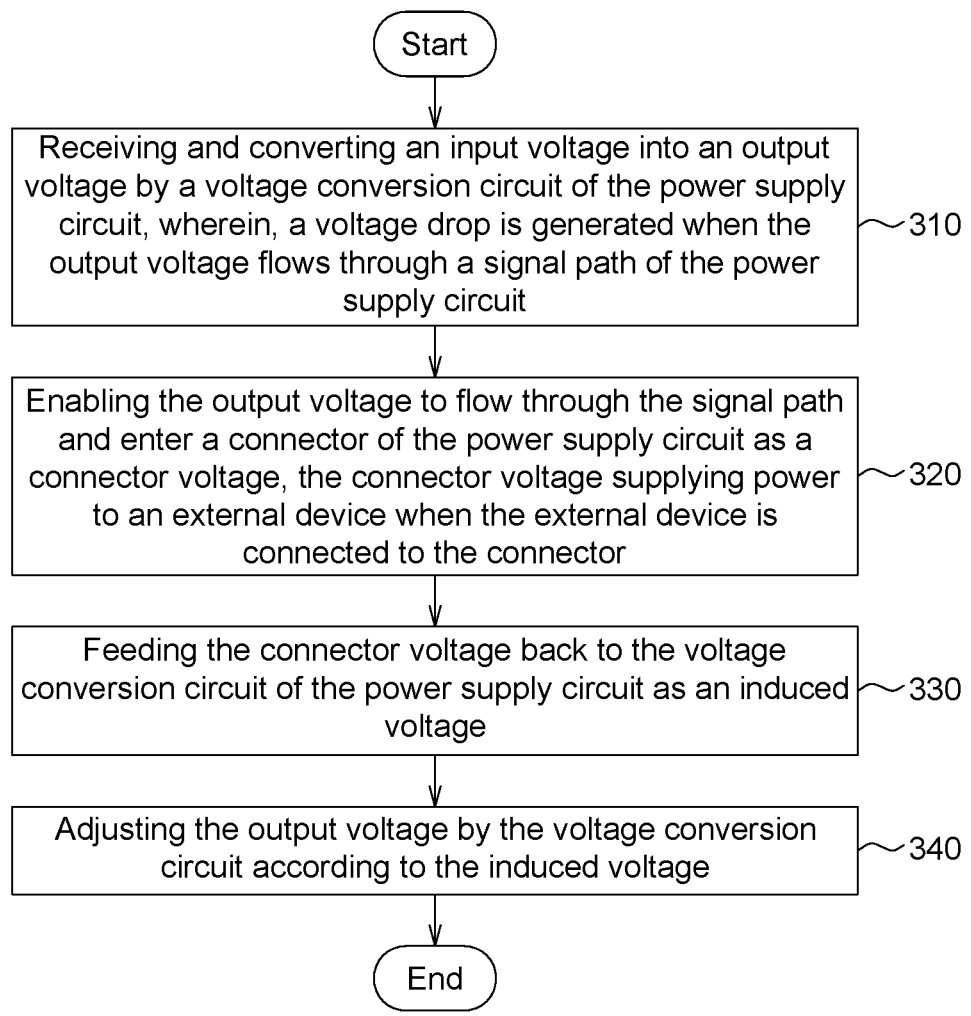
FIG. 3 is a flowchart of a voltage drop compensation method according to an embodiment of the present invention.

FIG. 3 is a flowchart of a voltage drop compensation method according to an embodiment of the present invention. The voltage drop compensation method includes: receiving and converting an input voltage into an output voltage by a voltage conversion circuit of the power supply circuit, wherein, a voltage drop is generated when the output voltage flows through a signal path of the power supply circuit (step 310); enabling the output voltage to flow through the signal path and enter a connector of the power supply circuit as a connector voltage, the connector voltage supplying power to an external device when the external device is connected to the connector (step 320); feeding the connector voltage back to the voltage conversion circuit of the power supply circuit as an induced voltage (step 330); and adjusting the output voltage by the voltage conversion circuit according to the induced voltage (step 340).

As disclosed above, the present invention provides a power supply circuit, a voltage drop compensation method and an electronic product using the same capable of compensating the voltage drop, which occurs after the connector voltage VCON flows through a signal path, to increase the power supply performance of the electronic product and the power supply circuit without employing any additional elements.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply circuit, comprising:
    a voltage conversion circuit for receiving and converting an input voltage into an output voltage;
    a signal path coupled to the voltage conversion circuit, wherein the signal path includes an overcurrent protection element, a diode, and an EMI protection element, and a voltage drop is generated when the output voltage flows through the signal path due to the overcurrent protection element, the diode, and the EMI protection element;
    a connector coupled to the voltage conversion circuit through the signal path, wherein the output voltage flows through the signal path and enters the connector as a connector voltage, the connector voltage supplying power to an external device when the external device is connected to the connector; and
    a feedback path coupled to the voltage conversion circuit and the connector, wherein the connector voltage, indicative of the voltage drop along the signal path, is fed back to the voltage conversion circuit as an induced voltage through the feedback path, and the voltage conversion circuit adjusts the output voltage according to the induced voltage,
    wherein:
    the signal path comprises: a circuit-board trace;
    the output voltage of the voltage conversion circuit sequentially flows through the circuit-board trace, the overcurrent protection element, the diode and the EMI protection element and enters the connector as the connector voltage;
    the connector voltage conforms with a USB specification; and
    the overcurrent protection element comprises a current switch and an e-fuse.

2. The power supply circuit according to claim 1, wherein, the voltage conversion circuit comprises a DC-DC converter or an AC-DC converter.

3. The power supply circuit according to claim 1, wherein, the feedback path comprises a voltage divider circuit, the voltage divider circuit comprising a first resistor and a second resistor connected in series, the first resistor coupled between the connector voltage of the connector and the voltage conversion circuit, and the second resistor coupled between the voltage conversion circuit and a ground end.

4. An electronic product, comprising:
    an outer casing, and
    a power supply circuit arranged inside the outer casing, wherein,
    the power supply circuit receives and converts an input voltage into an output voltage;
    when the output voltage flows through a signal path of the power supply circuit, a voltage drop is generated, and the output voltage becomes a connector voltage, the signal path including an overcurrent protection element, a diode, and an EMI protection element, and the voltage drop is generated when the output voltage flows through the signal path due to the overcurrent protection element, the diode, and the EMI protection element; when an external device is connected to the electronic product, the connector voltage supplies power to the external device; and
    the connector voltage, indicative of the voltage drop along the signal path, is fed back to a voltage conversion circuit as an induced voltage through the feedback path, and the voltage conversion circuit adjusts the output voltage according to the induced voltage;
    wherein, the power supply circuit comprises: the voltage conversion circuit for receiving and converting the input voltage into the output voltage; the signal path coupled to the voltage conversion circuit, wherein when the output voltage flows through the signal path, the voltage drop is generated; a connector coupled to the voltage conversion circuit through the signal path, wherein the output voltage flows through the signal path and enters the connector as the connector voltage; and the feedback path coupled to the voltage conversion circuit and the connector, wherein the connector voltage is fed back to the voltage conversion circuit as the induced voltage through the feedback path, and the voltage conversion circuit adjusts the output voltage according to the induced voltage;
    wherein, the signal path comprises: a circuit-board trace;
    wherein, the output voltage of the voltage conversion circuit sequentially flows through the circuit-board trace, the overcurrent protection element, the diode and the EMI protection element and enters the connector as the connector voltage;
    wherein, the connector voltage conforms with a USB specification; and
    wherein, the overcurrent protection element comprises a current switch and an e-fuse.

5. The electronic product according to claim 4, wherein, the voltage conversion circuit comprises a DC-DC converter or an AC-DC converter.

6. The electronic product according to claim 4, wherein, the feedback path comprises a voltage divider circuit, the voltage divider circuit comprising a first resistor and a second resistor connected in series, the first resistor coupled between the connector voltage of the connector and the voltage conversion circuit, and the second resistor coupled between the voltage conversion circuit and a ground end.

7. A voltage drop compensation method used in a power supply circuit, the voltage drop compensation method comprising following steps of:
    receiving and converting an input voltage into an output voltage by a voltage conversion circuit of the power supply circuit, wherein, a voltage drop is generated when the output voltage flows through a signal path of the power supply circuit, the signal path including an overcurrent protection element, a diode, and an EMI protection element, and the voltage drop is generated when the output voltage flows through the signal path due to the overcurrent protection element, the diode, and the EMI protection element;
    enabling the output voltage to flow through the signal path and enter a connector of the power supply circuit as a connector voltage, the connector voltage supplying power to an external device when the external device is connected to the connector;
    feeding the connector voltage back to the voltage conversion circuit of the power supply circuit as an induced voltage, the connector voltage, indicative of the voltage drop along the signal path, is fed back to the voltage conversion circuit as the induced voltage through the feedback path; and
    adjusting the output voltage by the voltage conversion circuit according to the induced voltage;
    wherein:
    the signal path comprises: a circuit-board trace, an overcurrent protection element, a diode, and an EMI protection element;

the output voltage of the voltage conversion circuit sequentially flows through the circuit-board trace, the overcurrent protection element, the diode and the EMI protection element and enters the connector as the connector voltage;

the connector voltage conforms with a USB specification; and the overcurrent protection element comprises a current switch and an e-fuse.

8. The voltage drop compensation method according to claim 7, wherein the step of receiving and converting the input voltage into the output voltage by the voltage conversion circuit of the power supply circuit comprises:

receiving and converting the input voltage into the output voltage by a DC-DC converter or an AC-DC converter.

9. The voltage drop compensation method according to claim 7, wherein, the step of feeding the connector voltage back to the voltage conversion circuit of the power supply circuit as the induced voltage comprises:

feeding the connector voltage back to the voltage conversion circuit of the power supply circuit as the induced voltage through a feedback path, the feedback path comprising a voltage divider circuit, the voltage divider circuit comprising a first resistor and a second resistor connected in series, the first resistor coupled between the connector voltage of the connector and the voltage conversion circuit, and the second resistor coupled between the voltage conversion circuit and a ground end.

* * * * *